United States Patent Office 3,546,234
Patented Dec. 8, 1970

3,546,234
BENZENE-SULFONYL-SEMICARBAZIDES
Erich Fauland, Felix Helmut Schmidt, and Kurt Stach, Mannheim-Waldhof, and Helmut Weber, Frankfurt am Main-Schwanheim, Germany, assignors to Boehringer Mannheim Gesellschaft mit beschrankter Haftung, Mannheim-Waldhof, Germany, a corporation of Germany
No Drawing. Filed June 19, 1967, Ser. No. 654,386
Claims priority, application Germany, Aug. 2, 1966, B 88,290
Int. Cl. C07c *143/78*
U.S. Cl. 260—293.4          9 Claims

ABSTRACT OF THE DISCLOSURE

A novel class of antidiabetic agents is disclosed, the same being represented by the following formula:

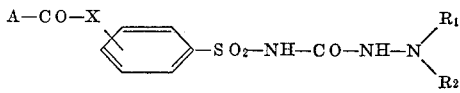

wherein A is an unsubstituted or substituted straight or branched chain, saturated or unsaturated aliphatic or cycloaliphatic hydrocarbon radical, an unsubstituted or substituted aryl, aralkyl, aryloxyalkyl, arylmercaptoalkyl or heterocyclic radical, X is a straight or branched chain saturated or unsaturated divalent hydrocarbon radical and $R_1$ and $R_2$ are each a straight or branched chain, saturated or unsaturated aliphatic, cycloaliphatic or araliphatic radical or taken together form an alkylene radical which can be substituted by alkyl, alkoxy or endoalkylene radicals or can be interrupted by hetero atoms. The alkali metal, alkaline earth metal and ammonium salts of the above compounds are equally effective as blood sugar reducing agents.

---

The present invention relates to novel benzene-sulfonyl-semicarbazides which possess important therapeutic properties and more specifically relates to novel benzene-sulfonyl semicarbazides and their alkali metal, alkaline earth metal and ammonium salts suitable for use as antidiabetic agents.

It is recognized that various benzene-sulfonyl-ureas and -semicarbazides have blood sugar-lowering properties and are suitable as antidiabetic compositions for oral administration (note for example, Arzneimittel Forschung, vol. 8, pp. 448–454/1958). In particular, $N_1$-sulfanilyl-$N_2$-(n-butyl) - urea and $N_1$ - (4-methyl-benzene-sulfonyl)-$N_2$-(n-butyl)-urea have achieved great importance in the therapy of diabetes.

In accordance with the invention, it has now been found that benzene-sulfonyl-semicarbazides represented by the following formula and including the alkali metal, alkaline earth metal and ammonium salts thereof:

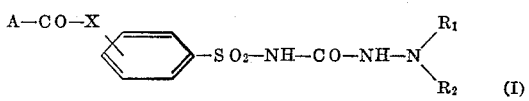

wherein A is an unsubstituted or substituted, straight or branched chain, saturated or unsaturated aliphatic or cycloaliphatic hydrocarbon radical, an unsubstituted or substituted aryl, aralkyl, aryloxyalkyl, arylmercaptoalkyl or heterocyclic radical, X is a straight or branched chain, saturated or unsaturated divalent aliphatic hydrocarbon radical and $R_1$ and $R_2$, which may be the same or different, are straight or branched chain, saturated or unsaturated aliphatic, cycloaliphatic or araliphatic hydrocarbon radicals or taken together form an alkylene radical which can be substituted by alkyl, alkoxy or endoalkylene radicals or can be interrupted by hetero atoms, are possessed of markedly strong blood sugar-lowering action and are substantially free of undesirable side reactions and toxic manifestations. The excellent tolerability of the compounds of the invention makes it possible when using the same as oral antidiabetic agents to achieve a wide range of treatment of diabetic conditions in regard to the factors of degree of activity and duration of active effect, which factors vary in one direction or the other with the individual compounds encompassed within the class of substances.

The compounds having the following structural formula possess the most advantageous properties in this respect and hence constitute a preferred subgroup of products:

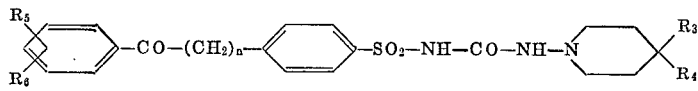

wherein $R_5$ and $R_6$ are each a member selected from the group consisting of hydrogen, halogen, lower alkyl and alkoxy, $R_3$ and $R_4$ are each hydrogen or lower alkyl and $n$ is 2 or 3.

The compounds of the present invention can be prepared by a number of known but equivalent reactions, as, for example, set forth hereinafter:

(a) Reaction of a benzene-sulfonyl compound of the formula:

with a compound of the formula:

wherein A, X, R₁ and R₂ have the same significance as set out above and one of the radicals Y and Z is an amino group and the other is an isocyanate group or a group convertible under the reaction conditions into an isocyanate group.

Thus, for example, a sulfonyl isocyanate can be reacted with a hydrazine or with an acyl derivative thereof or, alternatively, a sulfonamide, advantageously in the form of its sodium or potassium salt, can be condensed with an amino isocyanate former. By an "isocyanate former," there are to be understood those compounds which, under the reaction conditions, are capable of conversion into an isocyanic acid ester, for example, the corresponding carbamic acid halides, urethanes, thiourethanes, ureas and the acyl derivatives thereof, disulfonyl-ureas and the semicarbazides.

(b) Hydrolysis of a benzene-sulfonyl-thiosemicarbazide of the formula:

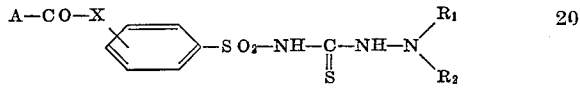

wherein A, X, R₁ and R₂ have the same significances as set out above, or hydrolysis of a benzene-sulfonyl-aminoguanidine of the formula:

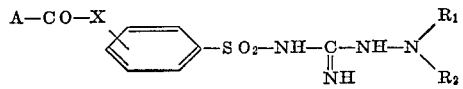

wherein A, X, R₁ and R₂ have the same meanings as given above, or hydrolysis of a benzene-sulfonyl-isosemicarbazide ether of the formula:

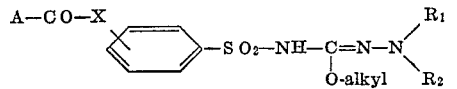

wherein A, X, R₁ and R₂ have the same significances as given above and U is an oxygen or sulfur atom.

The conversion of the sulfonyl-aminoguanidines is advantageously carried out by alkaline hydrolysis, for example, by means of an alkali metal hydroxide, that of the isosemicarbazide ethers by acidic hydrolysis, for example, by means of a hydrogen halide, and that of the thiosemicarbazides or of their thioethers by oxidative hydrolysis, as for instance, by means of nitrous acid or using heavy metal oxides, such as mercury oxide.

(c) Reaction of a benzene-sulfonyl halide having the formula:

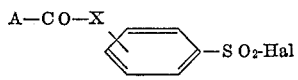

wherein A and X have the same significances as given above and Hal is a halogen atom, with a semicarbazide of the formula:

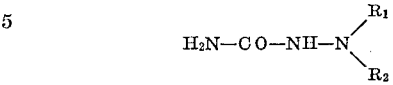

wherein R₁ and R₂ have the same meanings as described above.

In the instance of this last method, instead of the semicarazides, it is more advantageous to use the corresponding parabanic acid derivatives having the formula:

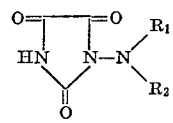

wherein R₁ and R₂ have the same meanings as given above, followed by hydrolysis of the intermediates obtained.

In the case of the above-mentioned syntheses, the ketone grouping can also first be introduced into the final sulfonyl-semicarbazide, in which connection, for example, the following possibilities can be used:

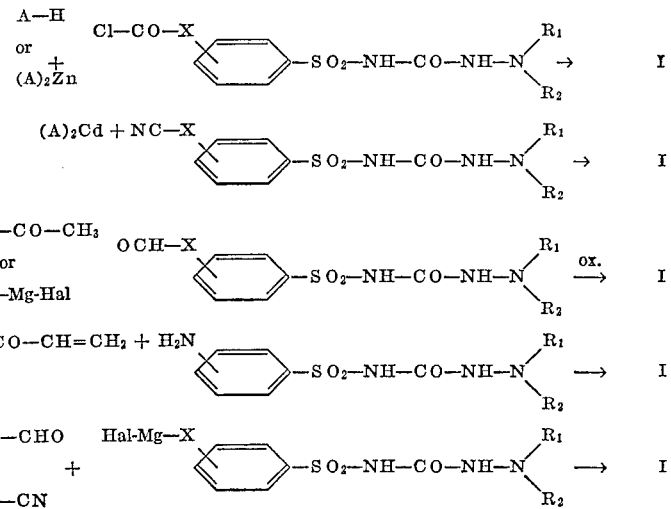

If desired, the compounds according to the present invention can be converted into their alkali metal, alkaline earth metal or ammonium salts in known manner.

The benzene-sulfonyl semicarbazide product in accordance with the invention (Formula I) is essentially acid in nature and forms alkali metal-, alkaline earth metal- and ammonium-salts and especially potassium-, sodium- and magnesium-salts as well as salts with various organic amines which are compatible with the human system. Such salts are prepared in the usual manner, for instance, by adding the metal or ammonium hydroxide to the sulfonyl semicarbazide compound. It is also possible to produce salts with organic bases which are compatible with the human system in the amounts administered.

The salts set forth herein are useful in the treatment of diabetes in like manner as the acid compound set forth herein, administered in the same dosage and in the time sequence as said compound. The more water-soluble the salt the more preferred is its application, ammonium salts giving particularly good results.

As indicated hereinabove, the compounds of the present invention are useful for the treatment of diabetes per orally and for this purpose, active compounds are associated with the pharmaceutically acceptable carrier. For such oral administration, the active compounds can be administered in liquid or solid dosage forms. Solid forms include capsules, tablets, powders, pills, and the like. Liquid forms include suitably flavored aqueous suspensions and solutions (depending on the concentration desired) and flavored oil suspensions in solutions with edible oils, as for example, corn oil, cottonseed oil, coconut oil, peanut oil, sesame oil, or mixtures of these and the like can be employed.

Preferred forms of administration are a quantity of the drug enclosed in a gelatin capsule or compounded as a tablet. The capsule may be of either the hard shell or soft shell type and is generally a gelatin although any water-soluble capsulating material that will disintegrate after oral administration is suitable. Lubricants, such as magnesium stearate and anti-caking agents to keep the drug in readily dispersible form may be incorporated in the dosage unit.

When tablets are prepared, they may be made in various sizes containing varying amounts of the drug. They are generally compounded with binding agents, lubricants, and other substances which are commonly used in tablet manufacture, such as magnesium stearates, stearic acid, talc, corn starch, lactose, or the like. If desired, these tablets may be coated with sugar or shellac preparations in accordance with the common practices in the tablet manufacturing art.

The compositions of the invention are supplied for example as tablets containing 50–100 mg. of active compound per tablet. For most patients the recommended daily dosage is: 50–200 mg., that is 1–2 tablets.

The invention is further illustrated in detail by the following examples.

Example 1.—4-[4-(γ-benzoyl-propyl)-benzene-sulfonyl]-1,1-pentamethylene-semicarbazide 7.5 g. 4-(γ-benzoyl-propyl)-benzene-sulfonyl-ethyl-urethane (M.P. 116–118° C.) were heated for 1 hour at 120° C. with 2 g. N-amino-piperidine in 15 ml. dimethyl formamide. After cooling, the reaction mixture was poured into water and the initially oily precipitate allowed to crystallize. Following recrystallization from methanol/dimethyl formamide, there was obtained, in 58% yield, 4 - [4 - (γ - benzoyl-propyl)-benzene-sulfonyl]-1,1-pentamethylene-semicarbazide having a melting point of 173–174° C.

Example 2.—4-[4-(γ-benzoyl-propyl)-benzene-sulfonyl]-1,1-(3-methylpentamethylene)-semicarbazide 7.5 g. 4 - (γ - benzoyl-propyl)-benzene-sulfonyl-ethyl-urethane were suspended in 200 ml. anhydrous toluene and boiled for 1 hour with 2.5 g. 4-methyl-N-amino-piperidine. Upon cooling the reaction mixture, the semicarbazide which was thereby formed precipitated out in crystalline form and was purified by dissolving in a dilute solution of sodium hydroxide, with the addition of acetone, followed by precipitation with dilute hydrochloric acid. After recrystallization from methanol, there was obtained in 62% yield, 4-[4-(γ-benzoyl-propyl)-benzene-sulfonyl] - 1,1 - (3-methylpentamethylene)-semicarbazide having a melting point of 145–147° C.

The following compounds were obtained in an analogous manner:

4 - [4 - (γ - benzolyl-propyl)-benzene-sulfonyl]-1,1-(3-methoxy - pentamethylene)-semicarbazide; M.P. 156–157° C.;

4 - [4 - (γ - benzolyl-propyl)-benzene-sulfonyl]-1,1-(3-isopropoxy-pentamethylene)-semicarbazide; M.P. 142–143° C.;

4 - [4 - (γ - benzoyl-propyl)-benzene-sulfonyl]-1-methyl-1-isobutyl-semicarbazide; M.P. 141–142° C.;

4 - [4 - (γ - benzoyl - propyl)-benzene-sulfonyl]-1,1-hexamethylene-semicarbazide; M.P. 171–172° C.;

4[4-(γ-benzoyl-propyl)-benzene-sulfonyl] - 1,1 - (3-ethyl-pentamethylene)-semicarbazide; M.P. 126–128° C.;

4[4-(γ-benzoyl-propyl)-benzene-sulfonyl] - 1,1-(2-methylpentamethylene)-semicarbazide; M.P. 153° C.;

4-[4-(γ-benzoyl-propyl)-benzene-sulfonyl] - 1,1 - (3,3-dimethyl - pentamethylene) - semicarbazide; M.P. 156–157° C.; and $N_1$-[4-(γ-benzoyl-propyl) - benzene - sulfonyl]-$N_2$-(nortropanyl-8)-urea; M.P. 180–181° C.

Example 3.—4-[4-(γ-4-methyl - benzoyl-propyl)-benzene-sulfonyl] - 1,1-(3,3-dimethyl-pentamethylene)-semicarbazide The process described in Example 2 was repeated with the exception that, instead of 4-(γ-benzoyl-propyl)-benzene-sulfonyl-ethyl-urethane, there was used the corresponding 4-methyl-benzoyl compound, which had a melting point of 126–128° C. There was thusly obtained 4-[4-(γ-methyl-benzoyl-propyl)-benzene-sulfonyl] - 1,1 - (3,3-dimethyl-pentamethylene)-semicarbazide which had a melting point of 153–154° C.

Example 4.—4-[4-(γ-4 - chlorobenzoyl-propyl)-benzene-sulfonyl]-1,1-pentamethylene-semicarbazide The process described in Example 2 was repeated but instead of 4 - (γ-benzoyl-propyl)-benzene-sulfonyl-ethyl-urethane, there was employed the corresponding 4-chlorobenzoyl compound, which had a melting point of 137–139° C. There was thusly obtained 4-[4-(γ-4-chlorobenzoyl-propyl) - benzene-sulfonyl]-1,1-pentamethylene-semicarbazide which had a melting point of 170–172° C.

The following compounds were obtained in an analogous manner:

4-[4-(γ-4-chlorobenzoyl - propyl)-benzene-sulfonyl]-1,1-(3,3 - dimethyl-pentamethylene) - semicarbazide; M.P. 143–144° C.; and $N_1$-[4-(γ - 4-chlorobenzoyl-propyl)-benzene-sulfonyl]-$N_2$-(nortropanyl-8)-urea; M.P. 200–201° C.

Example 5.—4[4-(γ-4-methoxy-benzoyl-propyl)-benzene-sulfonyl]-1,1-pentamethylene-semicarbazide The process described in Example 2 was repeated with the exception that, instead of 4-(γ-benzoyl-propyl)-benzene-sulfonyl-ethyl-urethane, there was used the corresponding 4-methoxy-benzoyl compound, which had a melting point of 132–133° C. There was thusly obtained 4-[4-(γ-4-methoxy-benzoyl-propyl)-benzene - sulfonyl] - 1,1-pentamethylene-semicarbazide which had a melting point of 152–153° C.

Example 6.—4-[4-(γ-2,5-dimethoxy - benzoyl - propyl)-benzene-sulfonyl]-1,1-(3,3-dimethyl - pentamethylene)-semicarbazide The process described in Example 2 was repeated but instead of 4 - (γ-benzoyl-propyl)-benzene-sulfonyl-ethyl-urethane, there was used the corresponding 2,5-dimethoxy-benzoyl compound, which had a melting point of 101–102° C. There was thusly obtained 4-[4-(γ-2,5-dimethoxy-benzoyl-propyl)-benzene-sulfonyl] - 1,1 - (3,3-dimethyl-pentamethylene)-semicarbazide which had a melting point of 130–131° C.

In an analogous manner, there was obtained 4-[4-(γ-2,5-dimethoxy-benzoyl-propyl) - benzene-sulfonyl] - 1,1-(3-ethyl-3-methyl-pentamethylene)-semicarbazide having a melting point of 112–113° C.

Example 7.—4-[4-(γ-4-methoxy-benzoyl-propyl) - benzene-sulfonyl] - 1,1 - (3,3-dimethyl pentamethylene)-semicarbazide 6.7 g. 4 - (γ-4-methoxy-benzoyl-propyl) - benzene-sulfonamide (M.P. 165° C.) were dissolved in 20 ml. dimethyl formamide. The resulting solution was mixed with the equivalent amount of sodium hydride and then stirred for 10 minutes at ambient temperature. Thereafter, 3.8 g. pyrocarbonic acid diethyl ester were added and, after a further 10–15 minutes, 0.73 g. hydrogen chloride, dissolved in a small quantity of absolute ethanol, was introduced therein. The solution of 4-(γ-4-methoxy-benzoyl-propyl)-benzene-sulfonyl-ethyl-urethane thereby obtained was mixed with 3.2 g. N-amino-4,4-dimethyl-piperidine in 150 ml. toluene and, in order to complete the reaction, the mixture was heated to 100° C. for 30 minutes. Following cooling, the reaction mixture was extracted with 0.2 N sodium hydroxide solution and the aqueous layer acidified with dilute hydrochloric acid. The precipitated material which was dissolved in a solution of sodium carbonate, with the addition of acetone, the solution clarified with charcoal and the semicarbazide then precipitated out with acetic acid. After recrystallization from dimethyl formamide/methanol/water, there was obtained 4-[4-(γ-4-methoxy - benzoyl-propyl)-benzene-sulfonyl]-1,1-(3,3-dimethyl-pentamethylene)-semicarbazide having a melting point of 139–140° C.

Example 8.—4-[4-(γ-2-methoxy-benzoyl - propyl) - benzene - sulfonyl]-1,1 - (3,3-dimethyl-pentamethylene)-semicarbazide The process described in Example 7 was repeated with the exception that, instead of 4-(γ-4-methoxy-benzoyl-propyl)-benzene-sulfonamide, there was used the corresponding 2-methoxy compound, which had a melting point of 146–147° C. There was thusly obtained 4-[4-(γ-2-methoxy - benzoyl-propyl)-benzene-sulfonyl]-1,1-(3,3-dimethyl-pentamethylene)-semicarbazide which had a melting point of 125° C.

In an analogous manner, there was obtained 4-[4-(γ-2-methoxy-benzoyl-propyl) - benzene - sulfonyl] - 1,1-pentamethylene-semicarbaxide which has a melting point of 138° C.

Example 9.—4-[4-(β-2-methoxy-5-chlorobenzoyl - ethyl)-benzene - sulfonyl] - 1,1-(3,3-dimethyl-pentamethylene)-semicarbaxide The process described in Example 7 was repeated however instead of 4-(γ-4-methoxy-benzoyl-propyl)-benzene-sulfonamide, there was used the corresponding 2-methoxy-5-chlorobenzoyl compound, which had a melting point of 160–162° C. There was thusly obtained 4-[4-(β-2-methoxy-5-chlorobenzoyl-ethyl)-benzene -sulfonyl] - 1,1-(3,3-dimethyl-pentamethylene)-semicarbazide which had a melting point of 146° C.

Example 10.—4-[4-(γ - 2 - methoxy-5-chlorobenzoyl-propyl) - benzene - sulfonyl]-1,1-(3,3-dimethyl-pentamethylene)-semicarbaxide The process described in Example 7 was repeated with the exception that, instead of 4-(γ-4-methoxy-benzoyl-propyl)-benzene-sulfonamide, there was used the corresponding 2-methoxy-5-chlorobenzoyl-propyl compound, which had a melting point of 94–96° C. There was thusly obtained 4-[4-(γ - 2 - methoxy-5-chlorobenzoyl-propyl)-benzene-sulfonyl]-1,1-(3,3 - dimethyl - pentamethylene)-semicarbazide which had a melting point of 149° C.

The following compounds were obtained in an analogous manner:

4-[4-(γ-2-methoxy - 5 - chlorobenzoyl-propyl)-benzene-sulfonyl]-1,1-pentamethylene-semicarbazide; M.P. 132° C.; and 4-[4-(γ-2-methoxy - 5 - chlorobenzoyl-propyl)-benzene-sulfonyl] - 1,1 - (3-ethyl-pentamethylene)-semicarbazide; M.P. 133° C.

Example 11.—4-[4-(γ - 2 - methoxy-5-methyl-benzoyl-propyl) - benzene - sulfonyl]-1,1-(3,3-dimethyl-pentamethylene)-semicarbazide The process described in Example 7 was repeated with the exception that, instead of 4-(γ-4-methoxy-benzoyl-propyl)-benzene-sulfonamide, there was employed the corresponding 2-methoxy-5-methyl - benzoyl - propyl compound, which had a melting point of 99–100° C. There was thusly obtained 4-[4-(γ-2-methoxy-5-methyl-benzoyl-propyl)-benzene - sulfonyl] - 1,1 - (3,3-dimethyl-pentamethylene)-semicarbazide which had a melting point of 141–142° C.

In an analogous manner, there was obtained 4-[4-(γ-2-methoxy - 5-methyl-benzoyl-propyl)-benzene-sulfonyl]-1,1-(3-methyl-pentamethylene)-semicarbazide; M.P. 135–136° C.

Example 12.—4-[4-(γ - hexahydrobenzoyl - propyl)-benzene-sulfonyl] - 1,1 - (3,3-dimethyl-pentamethylene)-semicarbazide 3.1 g. 4-(γ-hexahydrobenzoyl-propyl)-benzene-sulfonamide (M.P. 120–122° C.) were dissolved in 15 ml. dimethyl formamide, mixed with the equivalent amount of sodium hydride and the mixture stirred for 10 minutes at ambient temperature. 1.8 g. pyrocarbonic acid diethyl ester were then added and stirring continued for a further 5 minutes at about 40° C. The reaction mixture was thereafter mixed with 0.36 g. hydrogen chloride, dissolved in a little absolute ethanol, and thereafter with 1.8 g. N-amino-4,4-dimethyl-piperidine in 100 ml. toluene, whereupon the reaction mixture was heated under reflux for 30 minutes. Following cooling, the reaction mixture was extracted with 0.2 N sodium hydroxide solution and the solid sodium salt of 4-[4-(γ-hexahydrobenzoyl-propyl)-benzene-sulfonyl]-(1,1-(3,3 - dimethyl - pentamethylene)-semicarbazide which thereby separated out was filtered off with suction. This latter sodium salt was dissolved in acetone/water (1:1) and the free sulfonyl-semicarbazide precipitated out by the addition of dilute hydrochloric acid. Following recrystallization from methanol, the compound melted at 138–140° C.

Example 13.—3-[4-(γ - 5 - chloro-2-methoxy-benzoyl-propyl)-benzene-sulfonyl]-1-(norgranatanyl-9)-urea The procedure described in Example 12 was followed however 4-(γ-5-chloro-2-methoxy - benzoyl-propyl)-benzene-sulfonamide (M.P. 99–100° C.) and N-amino-norgranatane were employed as starting materials. There was obtained 3-[4-(γ-5-chloro - 2 - methoxy-benzoyl-propyl)-benzene - sulfonyl]-1-(norgranatanyl-9)-urea which, following recrystallization from methanol, had a melting point of 182–183° C.

In an analogous manner, there was obtained from 2-(γ - 5 - chloro-2-methoxy-benzoyl-propyl)-benzene-sulfonamide (M.P. 163–164° C.) and N-amino-4,4-dimethyl-piperidine, 4-[2-(γ-5 - chloro - 2 - methoxy-benzoyl-propyl)-benzene-sulfonyl] - 1,1 - (3,3-dimethyl-pentamethylene)-semicarbazide which, after recrystallization from methanol, had a melting point of 179–180° C.

In order to establish the effectiveness of the compounds of the invention as antidiabetic agents, the blood sugar lowering activity was determined as follows:

The minimum effective amount of each test compound was determined using healthy rabbits who had been kept without food for 16 hours. Each value reported in the table which follows represents at least 4 animals. The values signify threshold amounts, that is amounts at which a significant blood sugar lowering effect (15%) occurs. The compounds were given intravenously to eliminate the influence of different absorption in the intestinal track or other side factors and to thereby assure greater accuracy of the test. The animals' blood sugar was determined hourly, following the administration of the test compounds and was correlated with a control group of animals who were identically treated but using saline in place of test compound.

In the table, there are also reported "relative values," i.e., relative to N-sulfanilyl-N'-(n-butyl)-urea (Nadisan, Invenol, Carbutamide)=1. The threshold dose of this latter compound amounted in the instant experiment to 200 mg./kg.

The following compounds were employed in the tests:

A—4-[4-(γ-benzoyl-propyl)-benzenesulfonyl]-1,1-(3,3-dimethyl-pentamethylene)-semicarbazide B—4-[4-(γ-4-chlor-benzoyl-propyl)-benzensulfonyl]-1,1-(3,3-dimethyl-pentamethylene)-semicarbazide C—4-[4-($\gamma$-2,5-dimethoxy-benzoyl-propyl)-benzenesulfonyl]-1,1-(3,3-dimethyl-pentamethylene)-semicarbazide D—4-[4-($\gamma$-2,5-dimethoxy-benzoyl-propyl)-benzenesulfonyl]-1,1-(3-ethyl-3-methyl-pentamethylene)-semicarbazide E—4-[4-($\gamma$-2-methoxy-benzoyl-propyl)-benzenesulfonyl]-1,1-(3,3-dimethyl-pentamethylene)-semicarbazide F—4-[4-($\gamma$-2-methoxy-benzoyl-propyl)-benzenesulfonyl]-1,1-pentamethylene-semicarbazide G—4-[4-($\beta$-2-methoxy-5-chlor-benzoyl-ethyl)-benzenesulfonyl]-1,1-(3,3-dimethyl-pentamethylene)-semicarbazide H—4-[4-($\gamma$-2-methoxy-5-chloro-benzoyl-propyl)-benzenesulfonyl]-1,1-(3,3-dimethyl-pentamethylene)-semicarbazide I—4-[4-($\gamma$-2-methoxy-5-chlor-benzoyl-propyl)-benzenesulfonyl]-1,1-pentamethylene-semicarbazide J—4-[4-($\gamma$-2-methoxy-5-chlor-benzoyl-propyl)-benzenesulfonyl]-1,1-(3-ethyl-pentamethylene)-semicarbazide K—4-[4-($\gamma$-2-methoxy-5-methyl-benzoyl-propyl)-benzenesulfonyl]-1,1-(3,3-dimethyl-pentamethylene)-semicarbazide L—4-[4-($\gamma$-2-methoxy-5-methyl-benzoyl-propyl)-benzenesulfonyl]-1,1-(3-methyl-pentamethylene)-semicarbazide M—$N_1$-(p-toluolsulfonyl)$N_2$-(n-butyl)-urea [=Tolbutamide=Orinase]

N—4-(p-toluolsulfonyl)-1,1-hexamethylene-semicarbazide [=Tolazamide=Tolinase]

The results of the experiments are set out in the following table.

TABLE

| Compound: | Threshold dosage, rabbits, i.v. | Relative BZ,[1] activity, i.v. |
| --- | --- | --- |
| A | 0.5 | 400 |
| B | 0.5 | 400 |
| C | 0.25 | 800 |
| D | 1 | 200 |
| E | 0.25 | 800 |
| F | 0.5 | 400 |
| G | 0.5 | 400 |
| H | 0.1 | 2,000 |
| I | 0.25 | 800 |
| J | 0.25 | 800 |
| K | 0.25 | 800 |
| L | 0.25 | 800 |
| M | 20 | 10 |
| N | 2.5 | 80 |

[1] N-sulfanilyl-N'-(n-butyl)-urea ["Nadisan," "Invenol," "Carbutamide"].

It will be seen from the above table that the products of the invention are better than any of the known compounds, the improvement in blood sugar lowering activity amounting to several powers of ten. In this connection it is important to note that the comparison of known compounds represent the preferred and most generally used antidiabetic agents now available.

We claim:
1. A compound selected from the group consisting of:
(a) benzene sulfonyl semicarbazides having the formula:

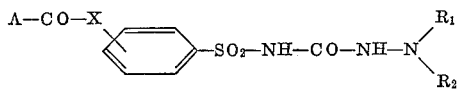

wherein A is a member selected from the group consisting of halogen substituted phenyl, lower alkyl substituted phenyl, lower alkoxy substituted phenyl and cyclohexyl, X is alkylene containing 2 to 3 carbon atoms and $R_1$ and $R_2$ are each alkyl containing 1 to 4 carbon atoms and when taken together form an alkylene containing 5 to 6 carbon atoms which can be substituted by lower alkyl or lower alkoxy; and $R_1$ and $R_2$, taken together with the nitrogen atom to which they are attached are nortropanyl or norgranatanyl, and (b) alkali metal alkaline arth metal and ammonium salts thereof.

2. A compound according to claim 1 having the formula:

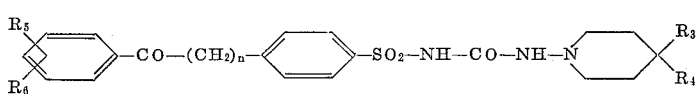

wherein $R_5$ and $R_6$ each represent a member selected from the group consisting of halogen, lower alkyl and alkoxy, $R_3$ and $R_4$ are each a member selected from the group consisting of hydrogen and lower alkyl and $n$ is 2 or 3.

3. A compound according to claim 1 designated 4-[4-($\gamma$-2,5-dimethoxy - benzoyl - propyl) - benzene - sulfonyl]-1,1-(3,3-dimethyl-pentamethylene)-semicarbazide.

4. A compound according to claim 1 designated 4 - [4 - ($\gamma$ - 2 - methoxy - benzoyl - propyl)-benzene-sulfonyl]-1,1-(3,3-dimethyl-pentamethylene)-semicarbazide.

5. A compound according to claim 1 designated 4 - [4 - ($\gamma$-2-methoxy-5-chloro-benzoyl-propyl)-benzenesulfonyl]-1,1 - (3,3 - dimethyl - pentamethylene) - semicarbazide.

6. A compound according to claim 1 designated 4-[4-($\gamma$-2-methoxy-5-chlor-benzoyl-propyl)-benzene - sulfonyl]-1,1-pentamethylene-semicarbazide.

7. A compound according to claim 1 designated 4-[4-($\gamma$-2-methoxy-5-chlor-benzoyl-propyl)-benzene - sulfonyl]-1,1-(3-ethyl-pentamethylene)-semicarbazide.

8. A compound according to claim 1 designated 4-[4-($\gamma$-2-methoxy-5-methyl-benzoyl - propyl) - benzene-sulfonyl]-1,1 - (3,3 - dimethyl - pentamethylene) - semicarbazide.

9. A compound according to claim 1 designated 4-[4-($\gamma$-2-methoxy-5-methyl-benzoyl - propyl) - benzenesulfonyl]-1,1-(3-methyl-pentamethylene)-semicarbazide.

References Cited

UNITED STATES PATENTS

| 1,915,334 | 6/1933 | Salzberg et al. | 260—243 |
| 2,075,359 | 3/1937 | Salzberg et al. | 167—22 |
| 3,041,331 | 6/1962 | Wright | 260—293.47 |
| 3,248,383 | 4/1966 | Muth | 260—293.47 |
| 3,372,164 | 3/1968 | Haack et al. | 260—293.43 |

HENRY R. JILES, Primary Examiner

S. D. WINTERS, Assistant Examiner

U.S. Cl. X. R.

260—239, 293, 294, 309.7, 453, 543, 552, 554, 556, 569; 424—244, 267, 323